United States Patent Office 2,847,517 Patented Aug. 12, 1958

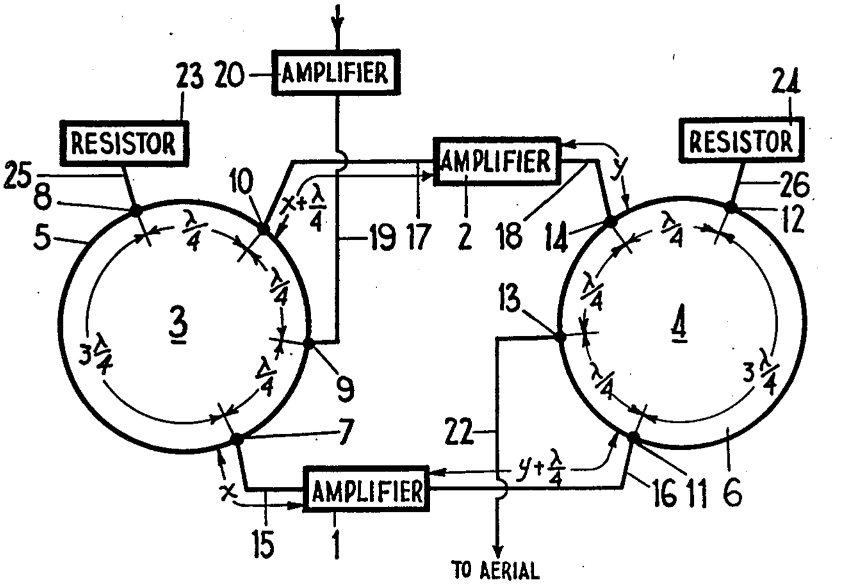
INVENTOR
GEORGE FREDERICK SMALL
BY [signature]
ATTORNEY

2,847,517

ELECTRIC AMPLIFIER ARRANGEMENTS

George Frederick Small, Bellingdon, near Chesham, England, assignor to The General Electric Company Limited, London, England Application June 15, 1954, Serial No. 436,925

Claims priority, application Great Britain June 23, 1953

5 Claims. (Cl. 179—171)

The present invention relates to electric amplifier arrangements.

In multi-channel signalling systems it is known to combine the several channels in frequency division multiplex and to transmit the resulting signal over a radio link by frequency modulation. If the last amplifier stage of a transmitter in such a system, for example at a relay station, is connected to its aerial system by means of a simple feeder in the usual manner, it is found that there may be serious phase distortion of the transmitted signal. This is due to a small portion of the signal to be transmitted being reflected back down the feeder from the mis-match between the feeder and the aerial system. If the final amplifier stage does not present the correct impedance to the feeder, this echo will again be reflected and will return to the aerial system with the result that a portion of the echo will be transmitted. The interval between the required signal and the echo being transmitted is the time taken for the echo to travel twice the length of the feeder.

One object of the present invention is to provide an arrangement in which this difficulty is overcome or in which the power of the reflected echo is substantially reduced.

The invention makes use of hybrid devices of the type which are sometimes known under the name "ring hybrid" or "rat-race." An essential feature of a device of this type is an electrical path which is in the form of a closed loop and which has four terminals, the four terminals being spaced round the loop so that, by virtue of the different electrical distances between the terminals measured the two ways round the loop at a particular frequency when the terminals are correctly terminated, there is coupling between one of the terminals and two of the other terminals, while there is no coupling between that one terminal and the remaining terminal. The loop may be circular in shape while the electrical path may be provided by either a waveguide or a co-axial transmission line.

According to the present invention, an electric amplifier arrangement comprises a pair of amplifiers, means to supply the signal to be amplified to each of the said amplifiers, and a hybrid device for combining the output from the two amplifiers, the electrical lengths of the paths between the two amplifiers and the hybrid device differing by an odd number of quarter wavelengths at the frequency of operation so that only a fraction (if any) of any signal supplied to the hybrid device over the path of the output signal from the hybrid device is reflected back over that path.

According to a feature of the present invention, an electric amplifier arrangement comprises a first hybrid device to which is arranged to be suplied an input signal, a pair of amplifiers which are arranged to be fed from the first hybrid device, and a second hybrid device for combining the output from the two amplifiers, the electrical lengths of the paths between the first hybrid device and the two amplifiers differing by an odd number of quarter wavelengths at the frequency of operation while the electrical lengths of the paths between the two amplifiers and the second hybrid device differ by an odd number of quarter wavelengths at the frequency of operation so that the signals supplied over these two paths to the second hybrid device are in phase and any signal supplied to the second hybrid device over the path of the output signal from that device is not appreciably reflected back over that path but is absorbed by resistance connected to the second hybrid device.

One example of an amplifier arrangement in accordance with the present invention will now be described with reference to the accompanying diagrammatic drawing which shows the basic circuit of the arrangement. This amplifier arrangement constitutes the final amplifier stage of a frequency modulation transmitter which has a mean operating frequency in the region of 2,000 megacycles per second and which is required to transmit a signal that carries the intelligence of a plurality of audio channels in frequency division multiplex.

Referring now to the drawing, the amplifier arrangement comprises two like amplifiers 1 and 2 which are connected between a pair of hybrid devices 3 and 4. Each of the devices 3 and 4 is in the form of a ring 5 or 6 of co-axial transmission line having an electrical length equal to one and a half wavelengths at the centre frequency of the range of frequencies of the transmitted signal. This wavelength is hereinafter written as $\lambda$. The two devices 3 and 4 each have four terminals 7 to 10 and 11 to 14 and, considering more particularly the device 3, the terminals 7 and 8 lie on opposite sides of the ring 5, that is to say separated both ways round the ring by a distance equal to $3\lambda/4$ while the terminals 9 and 10 are spaced $\lambda/4$ from the terminals 7 and 8 respectively and $\lambda/4$ from one another.

Connection to each of the four terminals 7 to 10 and 11 to 14 of the hybrid devices 3 and 4 is by way of co-axial transmission line. A transmission line 15 having an electrical length $x$ is connected between the terminal 7 of the hybrid device 3 and the input of the amplifier 1 while the output from that amplifier is fed over a transmission line 16 having a length $$y+\frac{\lambda}{4}$$

to the terminal 11 of the hybrid device 4. Similarly the other amplifier 2 is supplied from the terminal 10 of the hybrid device 3 over a transmission line 17 having a length $$x+\frac{\lambda}{4}$$

while the output therefrom is applied to the terminal 14 of the hybrid device 4 over a line 18 having a length $y$.

A transmission line 19 is connected between the penultimate amplifier 20 of the transmitter and the terminal 9 of the hybrid device 3 while the aerial feeder 22 is connected to the terminal 13 of the hybrid device 4. Two matching resistors 23 and 24 are connected by way of transmission lines 25 and 26 to the terminals 8 and 12 respectively.

The transmission lines 15 to 19, 22, 25 and 26 all have a characteristic impedance of 62 ohms while the resistors 23 and 24 and the input and output impedances of the amplifiers 1 and 2 have nominally the same value. The transmission lines forming the rings 5 and 6 each has a characteristic impedance of approximately 87.7 ohms.

The amplifier 20 is of identical construction to the amplifiers 1 and 2 and each of these amplifiers consists of a single stage formed by a disc-seal triode valve. The amplifiers 1, 2 and 20 may each have a gain of four to five decibels.

In the hybrid device 3, for example, there is coupling between the terminals 7 and 9 since the distance one way round the ring 5 is $\lambda/4$ while the distance the other way round the ring is $5\lambda/4$ with the result that component signals passing the two ways round the ring 5 are additive. Similarly there is coupling between the terminals 9 and 10. The distances between the terminals 8 and 9, however is $\lambda/2$ one way round the loop and $\lambda$ the other way so that there is effectively substantially no coupling between these two terminals.

In operation of the arrangement described above, it will be appreciated that the signal supplied from the penultimate amplifier 20 is divided equally between the transmission lines 15 and 17, substantially none of this signal being absorbed by the matching resistor 23. Since the electrical distance between the terminal 9 and both the terminals 7 and 10 of the hybrid device 3 is $\lambda/4$, the signals supplied to these two transmission lines are in phase and, as the total electrical lengths of the two paths between the two hybrid devices 3 and 4 are the same, the amplified signals supplied to the hybrid device 4 are also in phase. These two signals thus combine at the terminal 13 of the hybrid device 4 and are supplied to the aerial feeder 22.

If now an echo is returned down the aerial feeder 22, due to mis-match between the feeder and the aerial, the hybrid device 4 will cause this echo to be divided equally between the transmission lines 16 and 18, the echo being in phase at the terminals 11 and 14 of that device. Owing to the difference in the electrical lengths of the two transmission lines 16 and 18, reflections due to any mis-match between these transmission lines and the amplifiers 1 and 2 result in the echo being returned to the terminals 11 and 14 in anti-phase. If now it is assumed that the two amplifiers 1 and 2 present the same mis-match, these reflected portions of the echo will be of the same aplitude, with the result that they will cancel out at the terminal 13 so that no part of the echo is returned over the aerial feeder 22. These reflected portions of the echo are in fact absorbed by the resistor 24.

It is found that even if the mis-matches between the two transmission lines 16 and 18 and the two amplifiers 1 and 2 are not identical, the arrangement described above produces considerable reduction in the power of the reflected echo.

In order to enable a visual check to be made that the two amplifiers 1 and 2 are operating correctly with the same gain, two power monitors may be connected to the transmission lines 16 and 18 through unidirectional couplers.

I claim:

1. An electric amplifier arrangement comprising a pair of amplifiers each having an input and an output, means to supply the same signal to be amplified to the inputs of both of said amplifiers whereby both of said amplifiers pass identical signals having the same frequency and carrying the same intelligence, a hybrid device which has first and second input terminals and first and second output terminals and which serves to combine at the first output terminal oscillations that are supplied in phase to the two input terminals and to combine at the second output terminal oscillations that are supplied in anti-phase to the two input terminals, two paths which are connected respectively between the two amplifier outputs and the two input terminals of the hybrid device and which have electrical lengths differing by an odd number of quarter wavelengths at the frequency of operation, an output path connected to the first output terminal of the hybrid device, and resistance connected to the second output terminal of the hybrid device.

2. An electric amplifier arrangement according to claim 1 wherein the said hybrid device is formed by a ring of transmission line.

3. An electric amplifier arrangement according to claim 1 wherein the said hybrid device is formed by a ring of co-axial transmission line.

4. An electric amplifier arrangement according to claim 1 wherein the said means to supply the signal to be amplified to each of the said amplifiers comprises another hybrid device, an input path connected to the hybrid device, and a pair of paths which are connected respectively between this hybrid device and the two amplifiers, and which have electrical lengths differing by an odd number of quarter wavelengths at the said frequency.

5. An electric amplifier arrangement comprising first and second hybrid devices each having first, second, third and fourth terminals, an input path connected to the first terminal of the first hybrid device, resistance connected to the second terminal of the first hybrid device, first and second amplifiers each having an input and an output, a path which is connected between the third terminal of the first hybrid device and the input of the first amplifier and which has an electrical length x, a path which is connected between the fourth terminal of the first hybrid device and the input of the second amplifier and which has an electrical length $$x+\frac{\lambda}{4}$$

where $\lambda$ is the wavelength of the frequency of operation of the arrangement, a path which is connected between the output of the second amplifier and the first terminal of the second hybrid device, and which has an electrical length $y$, a path which is connected between the output of the first amplifier and the second terminal of the second hybrid device and which has an electrical length $$y+\frac{\lambda}{4}$$

resistance connected to the third terminal of the second hybrid device, and an output path connected to the fourth terminal of the second hybrid device.

References Cited in the file of this patent

UNITED STATES PATENTS

| | | |
|---|---|---|
| 2,266,197 | Hansell | Dec. 16, 1941 |
| 2,445,895 | Tyrrell | July 27, 1948 |
| 2,593,120 | Dicke | Apr. 15, 1952 |
| 2,661,424 | Goldstein | Dec. 1, 1953 |
| 2,685,065 | Zaleski | July 27, 1954 |